United States Patent [19]

Hornberger

[11] 4,352,774

[45] Oct. 5, 1982

[54] METHOD AND ARRANGEMENT FOR SUPPORT OF CONTACT ELEMENTS OF HAMMERMILLS AND THE LIKE

[75] Inventor: Michael E. Hornberger, Carlisle, Pa.

[73] Assignee: The Frog, Switch & Manufacturing Company, Carlisle, Pa.

[21] Appl. No.: 129,978

[22] Filed: Mar. 13, 1980

[51] Int. Cl.³ .............................................. B29D 3/00
[52] U.S. Cl. ..................................... 264/263; 241/197
[58] Field of Search .............. 241/191, 197, 291, 195, 241/300, DIG. 30; 264/261, 263

[56] References Cited

U.S. PATENT DOCUMENTS

| | | | |
|---|---|---|---|
| 2,534,301 | 12/1950 | Sennholtz | 241/197 |
| 2,874,912 | 2/1959 | Sennholtz et al. | 241/197 |
| 3,179,344 | 4/1965 | Morel | 241/197 |
| 3,207,448 | 9/1965 | Miller | 241/197 |
| 3,236,463 | 2/1966 | Rathowski | 241/197 |
| 3,322,356 | 5/1967 | Toews | 241/197 |
| 3,339,609 | 9/1967 | Cushman | 264/261 X |
| 3,503,562 | 3/1970 | Haberman | 241/195 |
| 3,545,691 | 12/1970 | Arsenank | 241/197 |
| 3,549,095 | 12/1970 | Ratkowski | 241/197 |
| 3,645,459 | 2/1972 | Lucas | 241/191 |
| 3,829,032 | 8/1974 | Schrimper | 241/197 |

Primary Examiner—Mark Rosenbaum
Assistant Examiner—Timothy V. Eley
Attorney, Agent, or Firm—Neuman, Williams, Anderson & Olson

[57] ABSTRACT

A method and arrangement for support of contact elements of hammermills and the like are disclosed in which a hardenable liquid bonding material is flowed into a chamber defined by registering recesses in facing relatively slidable surfaces of contact and support elements, the material being allowed to harden to define a key preventing relative slidable movement of the elements. A tongue-and-groove type of connection is provided for allowing the relative slidable movement while positively limiting relative movement in any direction in a plane transverse to the direction of the relative slidable movement.

2 Claims, 6 Drawing Figures

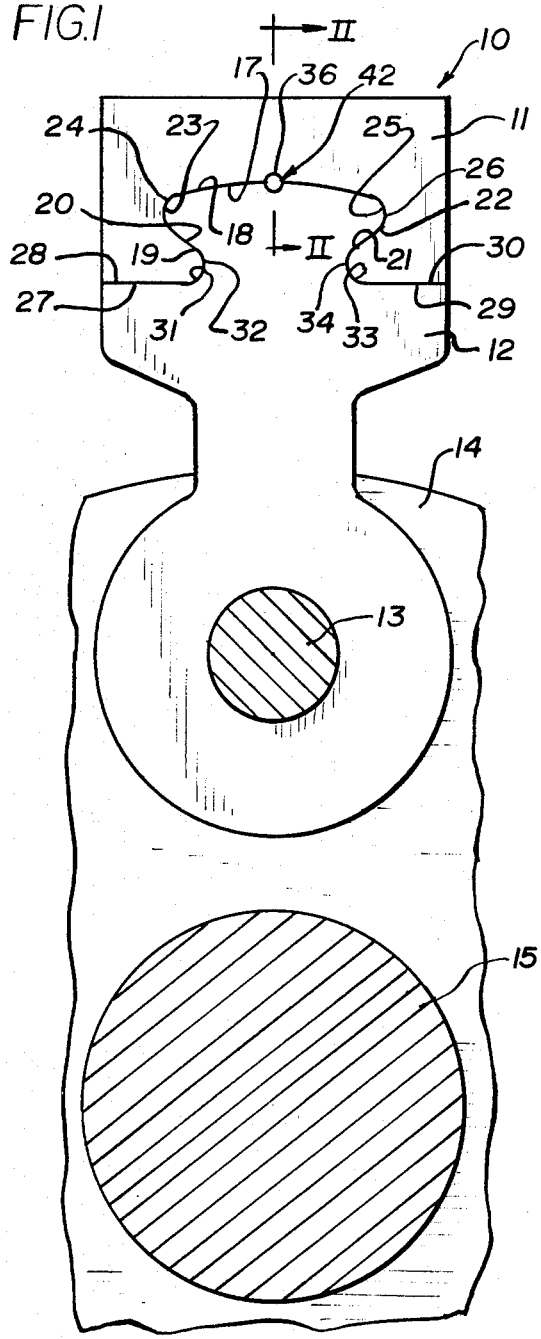
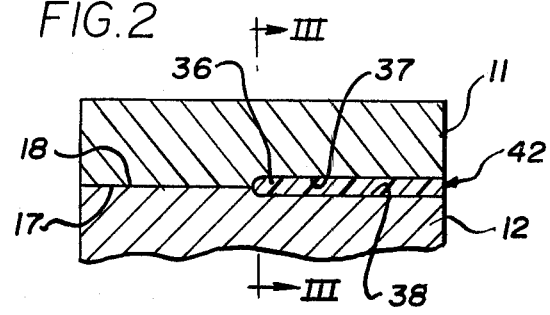
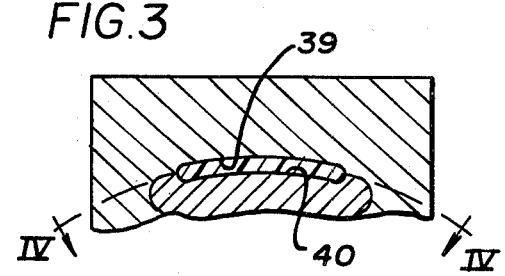
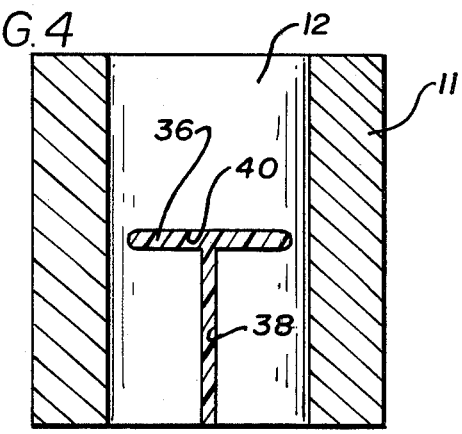
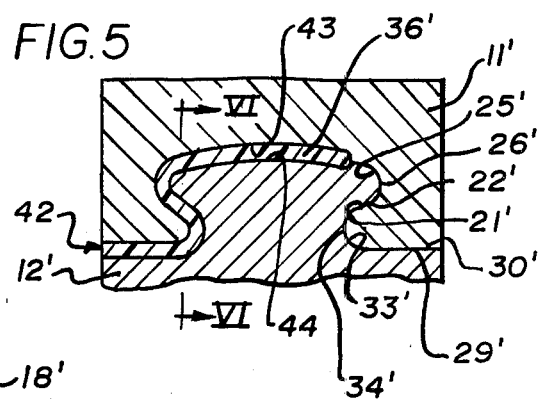
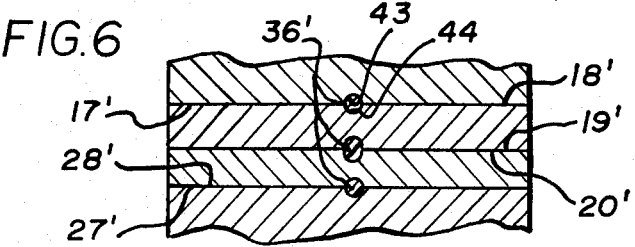

METHOD AND ARRANGEMENT FOR SUPPORT OF CONTACT ELEMENTS OF HAMMERMILLS AND THE LIKE

This invention relates to methods and arrangements for support of contact elements such as replaceable contact tips of hammermills and the like which are subjected to severe impact forces as well as requiring periodic replacement because of wear. The method and arrangement of the invention is such that the contact element can be readily installed and easily removed, when desired, while being securely and reliably supported during use.

BACKGROUND OF THE PRIOR ART

In hammermills and other forms of devices for treating materials, contact elements such as contact tips are caused to move into impact engagement with rocks or other materials to be treated so as to crush the materials. It is necessary that the contact elements be securely and reliably supported and since they are subjected to severe wear, it is also necessary that they be replaceable. In hammermills of the prior art, the contact tips have been supported at the ends of pivotal support arms through tongue-and-groove connections permitting relative slidable movement of the contact tips for installation thereof. Various forms of means have been provided for use after installation for preventing relative slidable movement away from the installed position. In some cases, suitable keys have been driven in, sometimes with a wedge engagement and in others, locking plates have been welded in place.

Such arrangements have been generally satisfactory and certain problems therewith and potentialities for improvements thereof have not been recognized in the prior art. In particular, the installation and removal of the contact tips has presented some degree of difficulty and has been time-consuming. Also, there has oftentimes been some degree of freedom of movement of the contact tips relative to the support arms, with corresponding problems connected therewith.

SUMMARY OF THE INVENTION

This invention was evolved with the general object of improving upon the support of the contact tips of hammermills and similar types of contact elements to obtain secure and reliable support thereof while permitting the elements to be readily installed, removed and replaced.

In accordance with this invention, a contact element such as the replaceable tip of a hammermill is installed on a support element and such elements have interlocking engagement means operative to permit relative slidable movement in one direction to an installed condition while positively limiting relative movement in any direction in a plane transverse to the direction of slidable movement. The elements include facing surface portions parallel to the direction of sliding movement with recesses in such surface portions which are in facing registering relation in the installed condition to define a chamber between such surface portions. The chamber is filled with a liquid plastic material which hardens to define a solid resilient holding and locking element which resiliently opposes relative slidable movement of the elements.

This comparatively simple arrangement permits the contact element to be easily and quickly installed and at the same time, it provides secure and reliable support of the contact element. The arrangement also permits the contact element to be removed and replaced, the plastic material being such that it can be effectively burned out by heating to an elevated temperature which, however, will not damage the contact and support elements.

The holding and locking element, in addition to preventing separation of the contact and support elements, operates to provide a resilient support such that the energies of impact with the contact element may be absorbed to a substantial extent, avoiding destructive contacts between interengaged surface portions of the support and contact elements.

The plastic material need not be an adhesive material to secure the elements together, but preferably is a material which operates to provide an adhesive bond to the surfaces of the recesses, providing additional support and facilitating the absorption of energies of impacts which might otherwise cause undesirable or destructive engagement between surface portions of the elements.

The recesses preferably include facing portions which are elongated in a direction transverse to the direction of relative slidable movement and may preferably also include facing portions which are elongated in a direction generally parallel to the direction of relative slidable movement.

In accordance with another specific feature, a fill opening is provided for flow of the plastic material into the chamber between registering recesses. Preferably, the fill opening may be provided at the terminal ends of portions of the recesses which are disclosed at edge portions of the surface portions of the elements aligned in the installed condition of the elements. With this feature, substantially all of the plastic material supplied into the device is utilized in performing holding, locking and energy absorbing functions.

Additional features of the invention relate to details of the formation of the recesses in surface portions such as provided in interlocking engagement means between the renewable tip element and the supporting arm element of a hammermill or the like.

This invention contemplates other objects, features and advantages which will become more fully apparent from the following detailed description taken in conjunction with the accompanying drawings.

BRIEF DESCRIPTION OF THE DRAWINGS

FIG. 1 is an elevational sectional view through a portion of a hammermill, providing an end elevational view of a contact tip and a supporting arm therefor with a connection provided according to the invention;

FIG. 2 is a sectional view taken substantially along line II—II of FIG. 1;

FIG. 3 is a sectional view taken substantially along line III—III of FIG. 2;

FIG. 4 is a sectional view taken substantially along an arcuate line IV—IV of FIG. 3;

FIG. 5 is a sectional view similar to FIG. 3 by illustrating a modified arrangement; and FIG. 6 is a sectional view taken substantially along line VI—VI of FIG. 5.

DESCRIPTION OF PREFERRED EMBODIMENTS

Reference numeral 10 generally designates a portion of a hammermill which includes a contact tip 11 and a support arm 12 interconnected in accordance with the principles of this invention. The support arm 12 is pivotally supported on a pin 13 which is supported by means including a disc 14 from a large diameter rotor shaft 15, the axis of the pin 13 being parallel to and spaced from the axis of the rotor shaft 15. The hammermill includes a plurality of additional contact tips which are supported in a similar fashion from the rotor shaft 15 and when the rotor shaft 15 is rotated, each contact tip 11 is caused to swing about the axis of the support pin 13 and is brought into impact engagement with a material to be treated, such as rocks or the like, to crush the material into smaller elements. The hammermill may, for example, have a construction as illustrated in the Pollitz U.S. Pat. No. 2,563,958 and the details of the construction thereof are not illustrated, since they may be conventional.

In the hammermill application and in similar applications of the invention, it is important that the contact element be securely and reliably supported from the support arm 12 or equivalent support element and it is also highly desirable that the contact element be replaceable because it is subjected to severe wear during use.

In the illustrated arrangement, interlocking means are provided between the contact element 11 and the support element 12, permitting relative slidable movement of the elements in one direction during installation and being operative in the installed condition to positively limit relative movement of the elements in any direction in a plane transverse to the direction of slidable movement. In the illustrated arrangement, the element 11 is slidably movable in a direction parallel to the axes of the pin 13 and the shaft 15, while movement in any direction in a plane transverse to such axes is positively limited.

The interlocking means in the illustrated arrangement is in the form of a tongue-and-groove connection which provides interengaging surface portions including a first pair of surface portions 17 and 18 of the elements 11 and 12 which are interengageable to limit movement of the contact element 11 along a radial line, toward the axis of the pin 13. The interengaging surface portions further include a second pair of interengaging surface portions 19 and 20 and a third pair of interengaging surface portions 21 and 22 which are disposed at angles such as to operate to limit movement of the contact element 11 away from the axis of the pin 13 and also to limit movement in directions transverse to the aforementioned radial line. A fourth pair of interengaging surface portions 23 and 24 and a fifth pair of interengaging surface portions 25 and 26 are provided between the opposite ends of the surface portions 17 and 18 and the surface portions 19, 21 and 20, 22 and are of rounded form such as to cooperate with such surface portions to prevent relative movement of the elements 11 and 12 in directions transverse to the aforementioned radial line and parallel thereto. In addition, a sixth pair of interengaging surface portions 27 and 28 and a seventh pair of interengaging surface portions 29 and 30 may cooperate with the surface portions 17 and 18 in preventing movement of the contact element 11 radially inwardly toward the axis of the pin 13, rounded surface portions 31-34 similar to surface portions 23-26 being provided between surface portions 19-22 and surface portions 27-30.

In accordance with the invention, interengaging surface portions of the two elements are formed with recesses which are in facing registering relation in the installed condition of the elements and such recesses define a chamber between such surface portions into which a plastic material is flowed to be hardened and to define a solid resilient holding and locking element 36 operative as a key to resiliently oppose relative slidable movement of the elements. In the arrangement as illustrated in FIGS. 1-4, such recesses are formed in the surface portions 17 and 18 and such recesses include a pair of portions 37 and 38 extending in a direction generally parallel to the direction of relative slidable movement of the elements, the portions 37 and 38 being parallel to the axis of the pin 13 in the illustrated arrangement. In addition, the recesses include portions 39 and 40 which extend in a direction transverse to the portions 37 and 38 and transverse to the direction relative to slidable movement. As shown in FIG. 4, the recess portions 38 and 40 of the support element 12 meet to form a recess of generally T-shaped configuration and the same is true with respect to the recess portions 37 and 39 of the contact element 11.

The recess portions 37 and 38 extend to terminal ends which are disposed at edge portions of the elements 11 and 12 aligned in the installed condition of the elements to define a fill opening generally indicated by reference numeral 42. In assembling of the elements, the contact element 11 is simply slidably engaged with the support element 12 and is moved to the installed condition as illustrated after which a liquid hardenable plastic material is caused to flow through the fill opening 42 and into the chamber defined by the recess portions 37-40, the plastic material being then allowed to harden to define the element 36.

The plastic material is preferably a material which forms an adhesive bond to the engaged surfaces of the elements 11 and 12. Many different compositions of plastic materials are usable, the well-known epoxy resin materials being suitable for the purpose in that they can provide desirable adhesive bonds to the engaged surfaces and, at the same time, they provide resiliency and strength characteristics such that the contact element 11 is securely held in position, the energies of impacts being absorbed to a substantial extent in the material of the element 36.

In the arrangement as illustrated in FIGS. 1-4, the portion of the element 36 between the portions 37 and 38 of the recess is subjected primarily to shearing forces in response to relative displacement of the contact element 11 in a direction parallel to the axis of the pin 13 and, since this portion of the element 36 is elongated in a direction parallel to the axis of the pin 13, it has a substantial strength with respect to such shearing forces.

With respect to the portion of the element 36 between the recess portions 39 and 40, it is subjected also to shearing forces and is also subjected to a compressive action in response to relative movement of the contact element 11 in a direction parallel to the axis of the pin 13. Since this portion of the element 36 is elongated in a direction transverse to the axis of the shaft 13, it has a relatively large strength with respect to such compressive forces.

FIGS. 5 and 6 illustrate a modified arrangement including a modified contact element 11', a modified support element 12' interconnected through an interlocking connection formed by surface portions similar to the surface portions 17-30 as above described, the corresponding surface portions being indicated by primed numbers. In this modified construction, no recess portions are provided in a direction parallel to the axis of the support pin, but a pair of recess portions 43 and 44 are provided which are similar to the recess portions 39 and 40. In addition, pairs of recess portions are provided in the surface portions 19' and 20', 27' and 28', and in the interconnecting rounded surface portions, to extend trasversely in serpentine paths from the recess portions 43 and 44 to terminal ends at which a fill opening 46 is provided, the resultant element 36' having a serpentine shape.

It will be noted that in the arrangement of FIGS. 5 and 6, as well as in the arrangement of FIGS. 1-4, substantially all of the material of the holding and locking element is utilized in limiting relative movement of the elements as well as in performing energy absorbing functions. If desired, however, a passage could be provided within only one of the two elements, for supply of a liquid hardenable plastic material into a chamber defined by registering recesses of the two elements.

It will be noted that in both of the illustrated arrangements, the contact element is arranged to be slid onto the support element in either direction and the element 36 or the element 36' operates to resiliently oppose movement in either direction parallel to the axis of the support pin 13. This has an advantage in simplifying the construction and assembling of the elements. However, if desired, means could be provided for positively limiting movement in one direction, requiring installation only in that direction.

The elements 11 and 11' can be readily replaced, when worn, simply by heating the assembly to a temperature at which the holding and locking element 36 or 36' is effectively burned up, thereby permitting removal of the contact element 11 or 11' and replacement by a new element.

It will be understood that other modifications and variations may be effected without departing from the spirit and scope of the novel concepts of this invention.

What is claimed is:

1. In a method of securing a contact element to a support element to be carried by said support element for contact with material to be treated, the steps of forming one of said elements with a groove having a longitudinal direction and having a substantially uniform cross-sectional shape with uniform cross-sectional dimensions along its length, forming the other of said elements with a tongue having a longitudinal direction and having a substantially uniform cross-sectional shape substantially the same as that of said groove and with cross-sectional dimensions such as to fit into said grooves with a close tolerance fit, forming first and second narrow and elongated recesses in interengageable surfaces of said groove and said tongue at positions such as to register to define a channel extending to an entrance opening at aligned edge portions of said surfaces when the full length of said tongue is in said groove, positioning one end of said tongue in alignment with one end of said groove and then moving said contact element relative to said support element to longitudinally slide said tongue in said groove to an installed condition in which substantially the full length of said tongue is in said groove and in which said first and second recesses register to define said channel having an entrance opening at aligned edge portions of said surfaces, then flowing a hardenable liquid bonding material through said entrance opening into said channel to fill said channel with said material, and allowing said material to harden to develop a solid resilient holding and locking element operative to resiliently oppose relative slideable movement of said contact and support elements away from said installed condition.

2. In a method as defined in claim 1, the steps of heating the assembly of said contact element and said support element to a temperature sufficient to effectively burn out said holding and locking element, removing said contact element, engaging a new contact element with said support element and slideably moving the new contact element to position said elements in said installed condition, flowing a hardenable liquid bonding material into said channel, and allowing said material to harden.

* * * * *